May 14, 1963 J. G. DUNCAN III 3,089,480
SOLAR HEAT ABSORBING STRUCTURE
Filed July 5, 1961 2 Sheets-Sheet 1
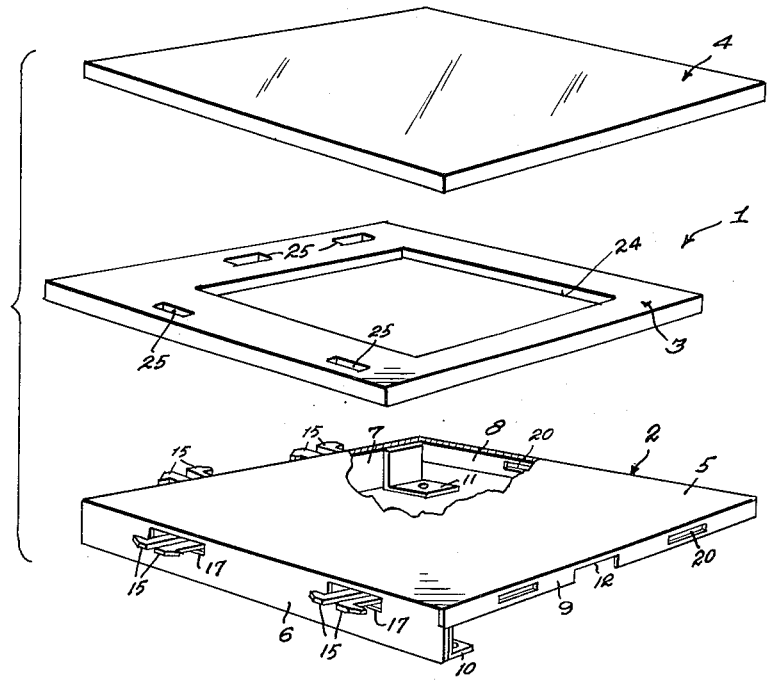
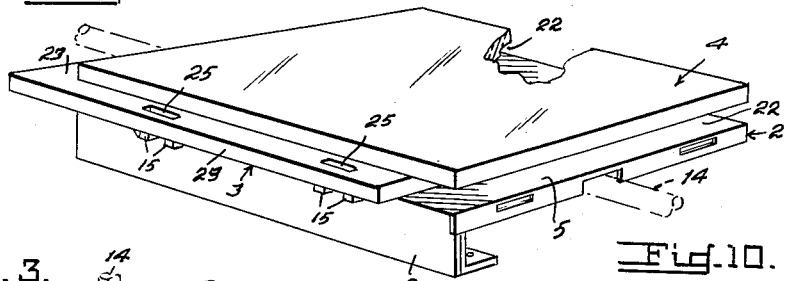
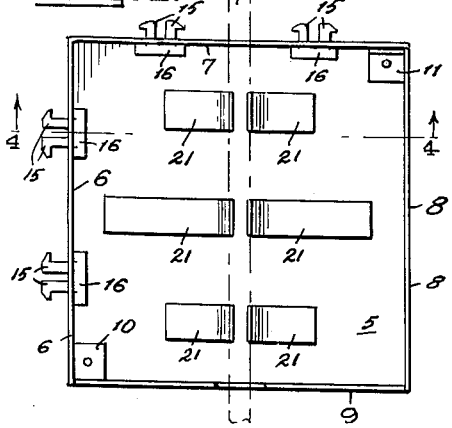
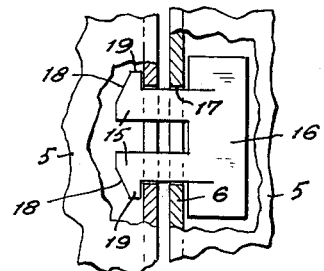
INVENTOR.
Joseph G. Duncan III
BY
S. J. Rotondi & A. J. Dupont May 14, 1963 J. G. DUNCAN III 3,089,480
SOLAR HEAT ABSORBING STRUCTURE
Filed July 5, 1961 2 Sheets-Sheet 2
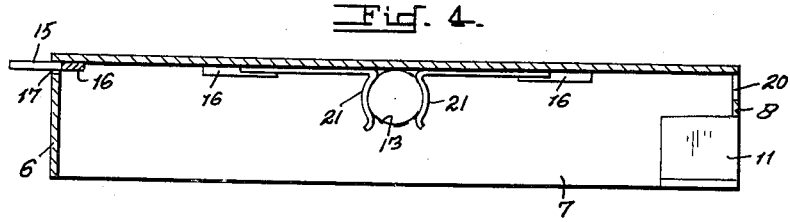
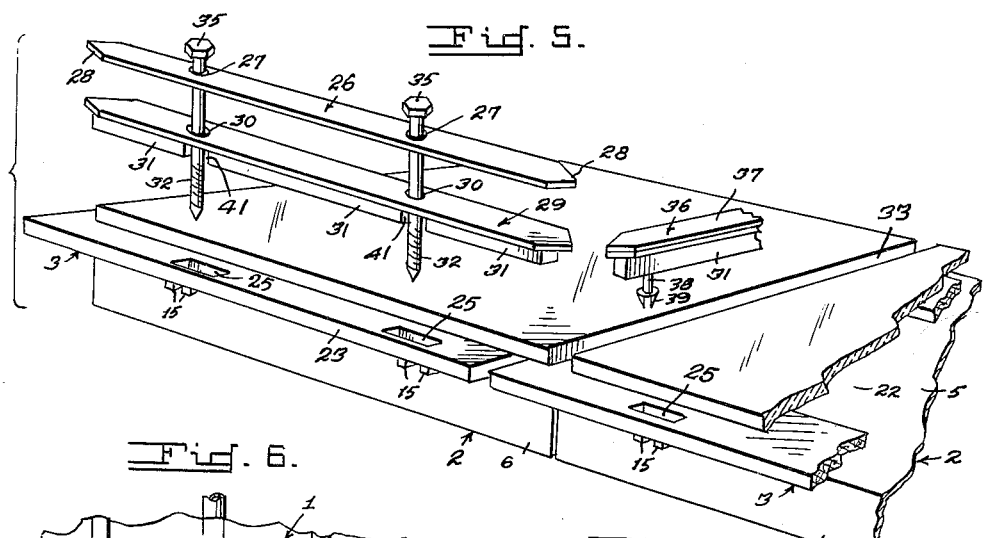
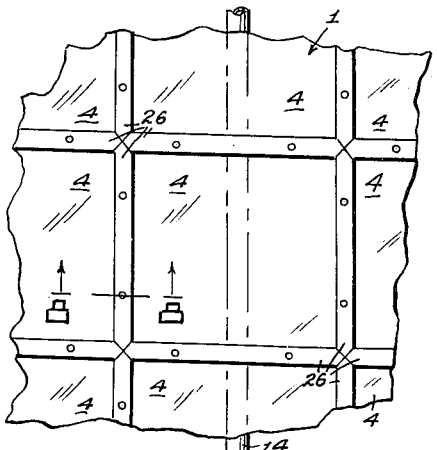
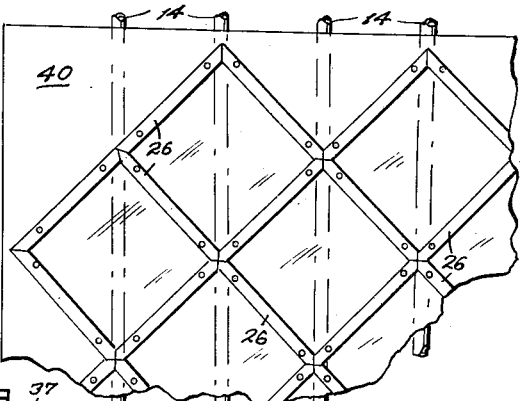
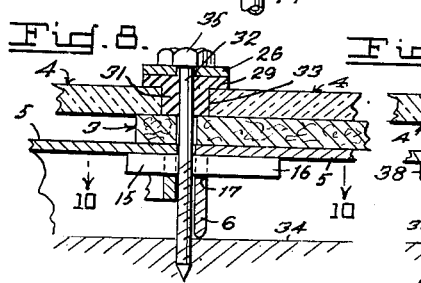
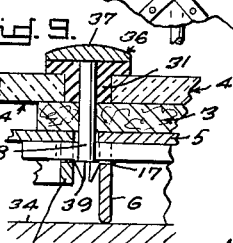
INVENTOR.
Joseph G. Duncan III
BY
S. J. Rotondi & A. J. Dupont United States Patent Office 3,089,480
Patented May 14, 1963

3,089,480
SOLAR HEAT ABSORBING STRUCTURE
Joseph G. Duncan III, Drexel Hill, Pa.
(128 N. Broad St., Philadelphia 2, Pa.)
Filed July 5, 1961, Ser. No. 123,375
4 Claims. (Cl. 126—270)
(Granted under Title 35, U.S. Code (1952), sec. 266)

The invention described herein may be manufactured and used by or for the Government for governmental purposes without the payment to me of any royalty thereon.

This invention relates to a solar heat absorbing structure and more particularly to a heat absorption unit used as a solar heat collector which is generally composed of an assembly of transparent material, such as glass which is placed over a heating medium such as a metal plate; water or gas which circulates through pipes, etc., under the plate and into a heat exchanger or storage means.

The collector is usually placed on the sunniest side of a structure where the rays of the sun, streaming through the transparent material, heat the fluid as it circulates towards the bottom to be collected in a pipe which is connected to whatever heat exchanger or storage means is provided for use for heating, refrigeration, or supplying hot water or other purposes.

Large expanses of glass are expensive and very difficult to handle, in addition to the need for a supporting structure therefor. Also, there is the problem of breakage. To replace a large sheet of glass is much more expensive than to replace a small pane at the point of breakage.

Also, a very large space between the collector and the large glass would involve a greater heat loss than if a series of smaller chambers were employed.

However, the mounting of a large number of small panes involves considerable ingenuity to prevent the panes from coming loose and rattling, and making the panes airtight in the collector assembly.

The present invention provides a solar heating unit which eliminates all of the aforesaid problems. Furthermore, each unit is very simple of structure and consists of a frame and plate to which a gasket is cemented. A pane of glass or plastic is cemented to the top of the gasket forming an air pocket between the plate and glass. The gasket is offset to provide a tongue on two sides of the unit and to provide grooves on the other two sides for interlocking with other units. Spring prongs carried by the underside of the plate snap into slots in another unit and lock the units rigidly and securely with each other and the entire assembly is fastened to the sheathing of the roof by brackets.

It is a prime object of this invention to provide a solar heating system made up of separate units which can be readily and quickly assembled to form a solar heating structure.

Another object is to provide heating units each having a tongue on two sides of the unit and a groove on the other two sides of the unit for interlocking assembly with other units to form a solar heating collector.

A further object is to provide a heating unit that is capable of easy framing in a solar heating collector with each unit forming an air pocket.

Still another object is to provide a heating unit for a solar heat collector that is more economical to use in that it can be repaired cheaply and quickly in case of breakage.

A final object is to provide a unit that is light in weight yet sturdy enough to withstand high winds and snow loads and be also rattleproof.

The specific nature of the invention as well as other objects and advantages thereof, will clearly appear from a description of a preferred embodiment as shown in the accompanying drawings in which:

FIG. 1 is an exploded view, in perspective, showing the elements of the invention;

FIG. 2 is a perspective view of the heating unit of the invention in assembled position;

FIG. 3 is a view of the under side of the plate, the pipe containing the heating medium being shown in broken lines;

FIG. 4 is a cross section view taken along line 4—4 of FIG. 3;

FIG. 5 is a perspective view of two joined units, showing two types of framing strips in exploded relation;

FIG. 6 is a top plan view of a few of the units as framed;

FIG. 7 is a view similar to FIG. 6 showing an alternative plan of lay out of the units provided with an edge;

FIG. 8 is a detail sectional view taken along line 8—8 of FIG. 6;

FIG. 9 is a similar view of an alternate type of framing strip; and,

FIG. 10 is a sectional view of the prongs.

Referring to the drawing, reference character 1 designates one of the units generally.

Each unit consists of three rectangular members, a plate 2, a gasket 3 and a window 4, all members having equal sides.

Plate 2 comprises a planar top 5 which is turned down at its sides to form flanges 6, 7, 8 and 9.

Flanges 6 and 7 are longer than flanges 8 and 9.

Plate 2 is preferably of metal such as aluminum alloy or copper and its top 5 is of rough finish and coated with dark paint or other substance.

Brackets 10 and 11 are fastened to an outer corner of flanges 6 and 7 as shown in FIGS. 1 and 3.

A cutout 12 and a hole 13 are provided in flanged sides 9 and 7 respectively for the purpose of receiving a pipe 14 through which the heating medium such as water circulates.

Means for interlocking the units with one another are provided and consist of pairs of prongs 15 which extend outwardly from a body portion 16 which is fastened to the underside of top 5. Flexible prongs 15 are arranged on two of the sides 6 and 7 and the prongs 15 extend through slots 17 for a distance, as best seen in FIG. 10.

Each pair of prongs 15 (see FIG. 10) are formed with beveled outer edges 18 and catch portions 19 for engaging a slot in the next unit.

Sides 8 and 9 are also provided with slots 20 to receive prongs 15.

Secured to the underside of top 5 are heat gathering clips 21 which may be of varying lengths and in different positions. These clips engage over pipe 14 and aid in transferring heat from top 5 to pipe 14 as well as aiding in more firm securement of plate 2.

Gasket 3 is of an insulating material, and as seen in FIGURE 2, is cemented to the top 5 of plate 2 in an offset manner whereby spaces 22 (see FIG. 2) are formed on two sides of the unit and tongues 23 are formed on the other two sides of the unit for receiving the tongues and fitting into the spaces respectively of other similar units (see FIG. 5).

Gasket 3 comprises a frame having cut out portion 24 extending on all four sides and is cemented to the top of plate 2. Slots 25 are provided in gasket 3 for a purpose to be described later.

Window 4 is preferably of transparent annealed glass and is a solid pane which is cemented onto the top surface of gasket 3 in alignment with the top 5 of plate 2 as seen in FIG. 2 to form the spaces 22 and tongues 23.

An air pocket is formed between window 4 and plate 2 which aids in heating plate 2.

Means for framing and securing the units to the sheathing of a roof are provided and are illustrated in FIGS. 5-9 and consist of a metal framing strip 26 having double beveled ends 28 and mounting holes 27.

An insulating strip 29 is provided beneath strip 26 and its top portion is of similar contour as that of strip 26. This strip is also provided with mounting holes 30. Strip 29 is provided with downwardly depending portions 31 integral with the top portions.

In assembly (see FIGS. 6 and 8), the units 1 are interlocked with each other and are fastened to the sheathing of the roof by brackets 10 and 11 by nails, etc., through holes 27 of strip 26 and holes 30 of strips 29.

In assembly of the structure, a space 33 (see FIG. 5) is formed between the adjoining edges of windows 4 for the purpose of receiving the depending portions 31 of strips 29.

The dimensions of the members 2, 3 and 4 are such that slots 25 in tongues 23 are aligned over prongs 15 so that a fastening member such as a nail 32 may be inserted into holes 27 of strip 26, holes 30 of strip 29 and between a space 41 between the portions 29, slots 25 of tongue 23, between prongs 15 and into roof sheathing 34. Head 35 of nail 32 will force strip 26 against strip 29 to force portion 31 of strip 29 into space 33 and form an air tight seal. Insulating strip 29 may be of resilient material such as rubber, etc.

Nail 32 is driven into the sheathing 34 of a roof or like supporting surface and tightens all the members 2, 3 and 4 as well as seals all possible space between the windows 4.

Many arrangements of the units are possible for convenience or for decorative purposes. One such example is shown in FIG. 7. In this form of arrangement, an edging 40 is necessary. The edge 40 will be of similar construction as the units, with the exception of arrangements of slots, prongs, etc.

In FIG. 9, there is shown an alternate type of framing strip 36. This strip eliminates the nail 32 which must be driven into roof sheathing 34 and is formed of a top 37 of metal or the like having downwardly depending integral shank portions 38 terminating in spring portions 39 which engage between flanges 6 and 8 or 7 and 9 of another unit and does not reach the surface of the roof. In this arrangement, of course, securement of the units to the roof depends upon brackets 10 and 11 only.

Pipe 14 in the alternate arrangement will pass through the corners of the unit.

It will be apparent, that sun rays passing through glass 4 will heat the space between 5 and 4. Plate 2 will become hot and the heat will be transferred to pipe 14 by clips 21 as well as the underside of top 5 of the plate 2.

Should condensation form under glass window 4, the beads of condensation might act as a magnifying medium and cause even greater heat within the space between elements 2 and 4.

There is also no danger of breakage of window 4 by a very hot sun which would heat the metal portions of strips 26 and plate 2 since there is no contact of any metal part with window 4.

The air pocket under 5 of the unit forms an efficient heating means and actually is equivalent to the oven of a stove, and therefore results in obtaining quicker heat than heretofore has been possible.

Variations and modifications such as rectangular, pentagonal, etc., shapes may be effected without departing from the scope of the novel concept of the present invention as set forth in the appended claims:

What is claimed is:

1. In combination with a heat absorption means including a series of pipes for circulating a heating medium therethrough, a solar heat absorbing structure for heating said medium and assembled over said pipes, said structure comprising a multiplicity of units, each unit consisting of a rectangular plate disposed over one of the pipes and having a planar upper face, a rectangular gasket, having sides equal in length to the sides of said plate, said gasket being secured to the upper face of said plate and in diagonally offset relation thereto, and a rectangular transparent window having sides equal in length to the sides of said plate, said window being secured to the upper side of said gasket and in alignment with said plate whereby said unit is provided with a tongue along two adjacent sides and a space along the other two adjacent sides thereof, said tongues and said spaces adapted to enter into the spaces and to receive the tongues respectively of similar units to form a solar heat collector.

2. In combination with a heat absorption means including a series of pipes for circulating a heating medium therethrough, a solar heat absorbing structure assembled over said pipes, said structure comprising a multiplicity of units, each unit consisting of a rectangular plate having downwardly depending flanges along its edges thereof, there being a pair of spaced slots in each flange disposed adjacent the underside of said plate and a centrally disposed cut out portion in one of said flanges and a hole in a flange opposite said last named flange and being in alignment with said cut out portion, said cutout portion and said hole receiving one of the pipes therethrough, a series of heat gathering clips secured to the underside of said rectangular plate and engaging the pipe passing through said cutout and hole, a rectangular gasket having sides equal to the sides of said plate, said gasket being secured to the upper side of said plate and in diagonally offset relation thereto, there being a cut out portion in said gasket and a pair of spaced slots along two adjacent edges thereof, a rectangular window having sides equal to the sides of said plate and said gasket, said window being secured to the upper side of said gasket and in aligned relation with said plate, whereby a tongue portion is formed on two adjacent edges of said unit and a space is formed in the other two sides of said unit, said tongue and said spaces adapted to fit into the spaces and to secure the tongues respectively of similar units to form a solar heat collector, and means for locking the units together when so joined and arranged on a supporting surface and framing means for sealing said windows when in said joined relation with similar units.

3. A structure as claimed in claim 2 wherein said means for locking the units comprises a pair of spaced prongs secured at one of their ends to the underside of said plate adjacent a respective flange, the free ends of said prongs defining outwardly opposed catch portions, said prongs extending through a respective slot whereby they will engage through a slot in an adjoining unit of similar construction and lock said units, said prongs being arranged in bottom slots on two adjacent flanges only.

4. A structure as claimed in claim 2 wherein said framing means comprises a resilient insulating strip having downwardly depending portions fitting between the edges of two adjoining windows, a framing strip fitting over said insulating strip and a fastening member passing through said framing and said insulating strip and said slots in said gasket to be anchored in a supporting surface, said framing and soid insulating strips having double beveled ends whereby when in assembled position they will abut similar beveled strips along intersecting edges of said other units.

References Cited in the file of this patent

UNITED STATES PATENTS

| 2,311,579 | Scott | Feb. 16, 1943 |
| 2,519,281 | Presser et al. | Aug. 15, 1950 |
| 2,705,948 | Rostock | Apr. 12, 1955 |

FOREIGN PATENTS

| 235,563 | Great Britain | Feb. 4, 1926 |